(No Model.)
P. J. HELLER.
PLOW.
No. 567,136. Patented Sept. 8, 1896.
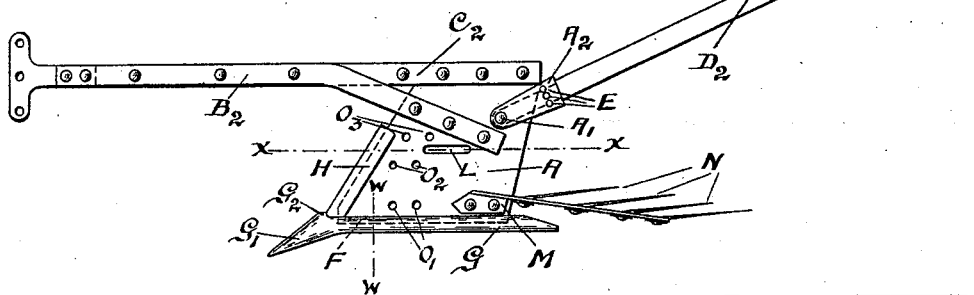
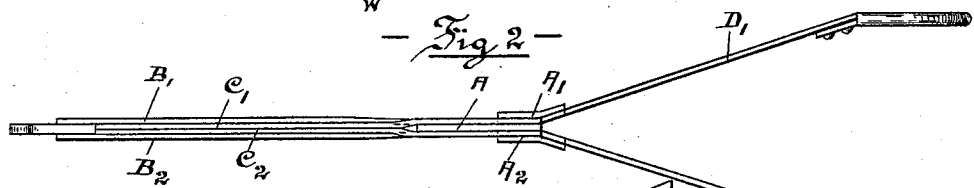
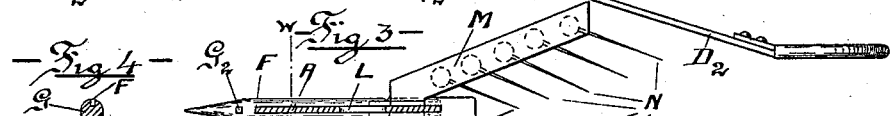
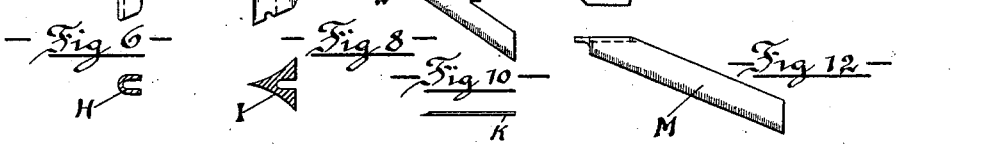
Witnesses —
Inventor —
Peter J. Heller
— by his — Attorney —
THE NORRIS PETERS CO., PHOTO-LITHO., WASHINGTON, D. C.

UNITED STATES PATENT OFFICE.

PETER J. HELLER, OF MONTCLAIR, NEW JERSEY.

PLOW.

SPECIFICATION forming part of Letters Patent No. 567,136, dated September 8, 1896.

Application filed October 12, 1895. Serial No. 565,445. (No model.)

*To all whom it may concern:*

Be it known that I, PETER J. HELLER, a citizen of the United States, residing at Montclair, in the county of Essex and State of New Jersey, have invented certain new and useful Improvements in Plows; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has for its object not only a more simple and easy method of performing the work required by each class of plows as combined by me in a single plow, in the adoption of the cutting-irons, shares, and knife adjustably to the main body of the plow, but also in the very simple construction of the plow itself there are advantages derived, such as making it lighter in draft, easier to repair, and in the very adjustability of each single item necessary for the special work desired there is an evident saving of time and expense, as such an item, if damaged in any way, can be repaired by itself without going to the trouble of forwarding the whole plow for repairs to the factory. One or two of the different constructions of these my improvements, although perhaps known in a different form before, have by my reconstruction, in the altered shape thereby attained, and in the placing thereof in the most effective place on the body of the plow, been given the fullest scope for cutting the earth, raising and pulverizing it from three to eighteen inches deep, and leaving it unturned.

In describing my construction I shall refer to the accompanying drawings, where like letters of reference indicate corresponding parts in the different views, and wherein—

Figure 1 represents a side view of the whole plow; Fig. 2, a top view of Fig. 1 down to line $x$ $x$ simply showing the gathering together of the plow-beam and handle-bars with the main body of the plow. Fig. 3 is a section through line $x$ $x$ in Fig. 1, showing the nether part of the plow and how the main body fits into the groove in the plow-shoe. Fig. 4 is a section on line $ww$ of Fig. 3, showing rear part of plow-shoe G. Fig. 5 is a side view of the front cutting-iron or colter for potato-digging; Fig. 6, a section through line $y$ $y$ in Fig. 5. Fig. 7 is a side view of the cutting-iron used for roads; Fig. 8, a section on line $z$ $z$ of Fig. 7. Fig. 9 is a top view of the knife to be fitted in the main body of plow for plowing bogs. Fig. 10 is a side view of Fig. 9. Fig. 11 is a side view of the left-side colter, showing iron attached to left side of the main body of the plow; and Fig. 12 is a top view of Fig. 11.

The construction of the plow proper is the following: Riveted to the main body A are the two outside pieces of flat (in section rectangular) iron B' and B², composing with the inside piece of flat iron C' and C² what is known as the "plow-beam," these latter also riveted to the top of main body A. On the rear part of A are the customary handle-bars D' and D², made on my plow adjustable by being pivoted to the body A by pivot A', and being held in pocket A² can be secured in either of the three holes E, so as to suit the height of the manipulator of the plow. The main body A is fitted into a groove F in the plow-shoe G, said shoe furnished in the front with a nose or projection G', shaped like a cone and, as indicated on drawings, pointing downward. On the front of the main body A there is a detachable cutting-iron or colter H, attached to the body A in some suitable manner, and supported on the plow-shoe G by a lug G² to prevent it from slipping off. Toward the rear end of body A a pair of shares M are attached, which according to the style of plow required are with or without prongs N, as illustrated in Fig. 1 (with prongs) and Figs. 11 and 12, (plain.) These above-mentioned parts constitute the plow proper.

The description of the different parts attached to the body A of the plow now following constitutes that part of my inventive act in which I, by securing to or removing from the main body A of the plow any one or more of the different parts, can transform the plow into either of the following uses: First, as an ordinary plow, the main body A is fitted with the cutting-iron or colter H and with one pair of shares without prongs in the position M, shown in Fig. 1, (should the nature of the ground require it, additional pairs of these plowshares can be attached where the holes O', O², and O³ are shown in body A;) secondly, as potato-digger the main body A has cutting-iron H attached and a pair of plowshares with prongs N in position M, as in Fig. 1; thirdly, as a cultivator, main body A has colter H attached and one pair of plowshares without prongs in position O', O², or O³, according to the depth desired in the ground; fourthly, as a road-plow, the main body A has the cutting-iron or colter I (shown in Figs. 7 and 8) substituted for colter H, (said colter I being, as shown in the sectional view, Fig. 8, furnished with a sharp cutting edge and concave sides, is specially adapted to cut up hard road-beds;) and fifthly, as a bog-plow, with the horizontal V-shaped knife K inserted in the slot L in main body A and keyed fast there by key K', and having colter H attached to the front, and, lastly, it can be used for other purposes, such as breaking ground, as its depth can be adjusted to about eighteen inches subsoil. The plow shares or wings M' are generally riveted or bolted to the main body A in the holes in position O', O², or O³, as they may be required, and the horizontal cutting-blade K has a notch K² fitting in the fore part of slot L to retain it in its position, and is otherwise held firmly in the slot by the taper-key K'.

What I then claim as new, and desire to secure Letters Patent for, is—

1. A plow of the construction set forth, consisting of the main body A made of straight metal plate, situated centrally with regard to the handles having pivoted thereunto a beam composed of four flat metal rods riveted together, said body A secured in the groove F of a shoe or landside of the character set forth, and a combination of said main body furnished with a slot, and a V-shaped knife secured in said slot by means of a key for the purposes as set forth, as described.

2. In a plow of the construction set forth, consisting of the main body A made of straight metal plate centrally situated furnished with pairs of rivet-holes in appropriate places, a combination of two wings of the construction set forth, having teeth or pulverizing-fingers riveted to them, riveted to the said body A in any pair of rivet-holes, for the purposes as set forth, as described and illustrated.

In testimony that I claim the foregoing I have hereunto set my hand this 10th day of October, 1895.

PETER J. HELLER.

Witnesses:
AUGUST M. TRESCHOW,
AXEL V. BEEKEN.